WILLIAM LINTON THOMPSON.

Improvement in Dish Washers.

No. 119,953. Patented Oct. 17, 1871.

Witnesses.
N. T. Sheafe
W. H. Whilcher

Inventor.
William Linton Thompson

UNITED STATES PATENT OFFICE.

WILLIAM LINTON THOMPSON, OF STANSTEAD, CANADA.

IMPROVEMENT IN DISH-WASHERS.

Specification forming part of Letters Patent No. 119,953, dated October 17, 1871.

*To all whom it may concern:*

Be it known that I, WILLIAM LINTON THOMPSON, of Stanstead, in the Dominion of Canada, have invented a new and useful Machine for Washing Dishes; and I do hereby declare that the following is a full, clear, and exact description of the construction and operation of the same, reference being had to the annexed drawing making a part of this specification, in which—

Figure 1:
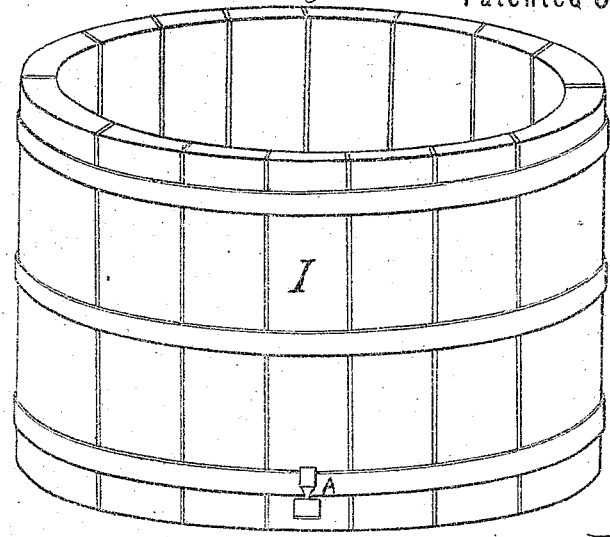
Figures 2, 3:
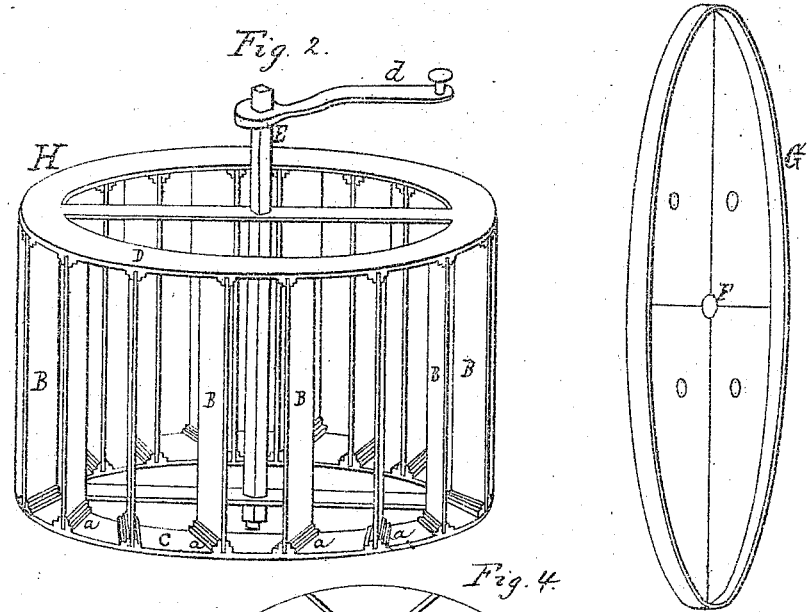

Figure 1 represents a cylindrical vessel, I, of any suitable dimensions, and made of wood or any material adapted for the purposes of this invention, with a faucet or discharge-pipe, A, near the bottom thereof. Fig. 2 represents a cylindrical dish-holder, H, which may also be made of wood or any material suitable for the purpose here intended, around the sides of which are placed floats B, extending between the two rims C and D at such an angle as shall be considered best to direct the current of water caused by the revolutions of the dish-holder in the said vessel or tube between the dishes, and so as to cause the most rapid and forcible flow of water through the same.

Figure 4:
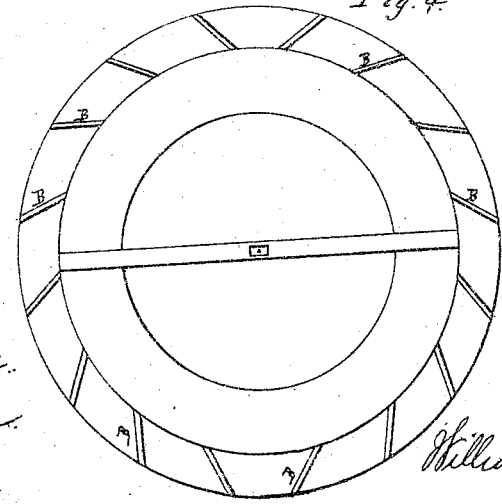

The floats of the dish-holder are fastened in the rims, both at top and bottom, by means of snugs or sockets *a* cast or cut in the said rims, and are attached by screws or nails. The dish-holder is centered on a shaft, E, to the top of which a crank or handle, *d*, in drawing, Fig. 2, is attached, by the movement of which crank the dish-holder is made to revolve with any desired rapidity. The floats are placed at different angles, as shown in section in Fig. 4, so that when the movement of the crank is reversed the current of water may be always directed to the center of the dish-holder and thus made to pass between the vessels that are to be washed. The dish-holder is held in its central position by means of a hole, F, cut in the cover G, (see drawing, Fig. 3,) and through which the shaft passes, and by a socket, in which the end of the shaft rests at the bottom of the tub or vessel, Fig. 1, which contains the dish-holder, thus enabling the operator to lift the dish-holder out of the containing-vessel and permit the dishes to dry, if desired, without being wiped.

The machine is operated by placing the dishes or vessels to be washed in the dish-holder, after which the containing-vessel is filled to a proper degree with suds. The cover is then placed upon the containing-vessel and the crank attached. The crank is then made to move with greater or less rapidity, as occasion may require, in one direction; the motion is suddenly reversed and it is made to revolve in the opposite direction. By these reverse movements and checks the suds is kept in agitation and forced around and between the dishes, which are thus cleansed.

What I claim as my invention is—

The cylindrical dish-holder H with the floats B, as described, placed at different angles, in combination with the vessel I and cover G, as and for the purpose specified.

Stanstead, P. Q., July 31, 1870.

WILLIAM LINTON THOMPSON.

Witnesses:
 N. T. SHEOFE,
 W. H. WHITCHES. (88)